June 9, 1925.
W. B. WIGLE
PISTON PACKING EXPANDING DEVICE
Filed July 11, 1923
1,541,546
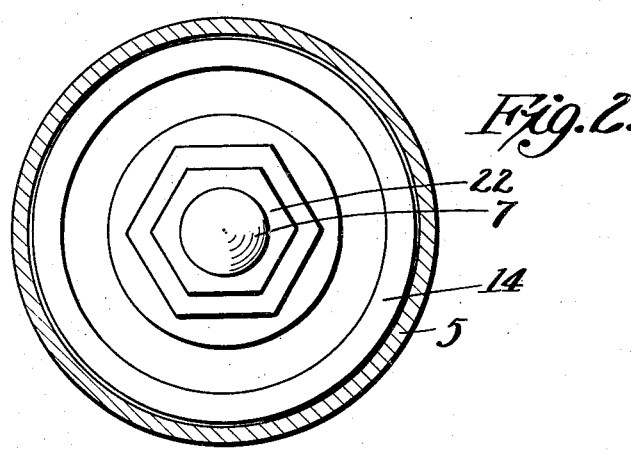
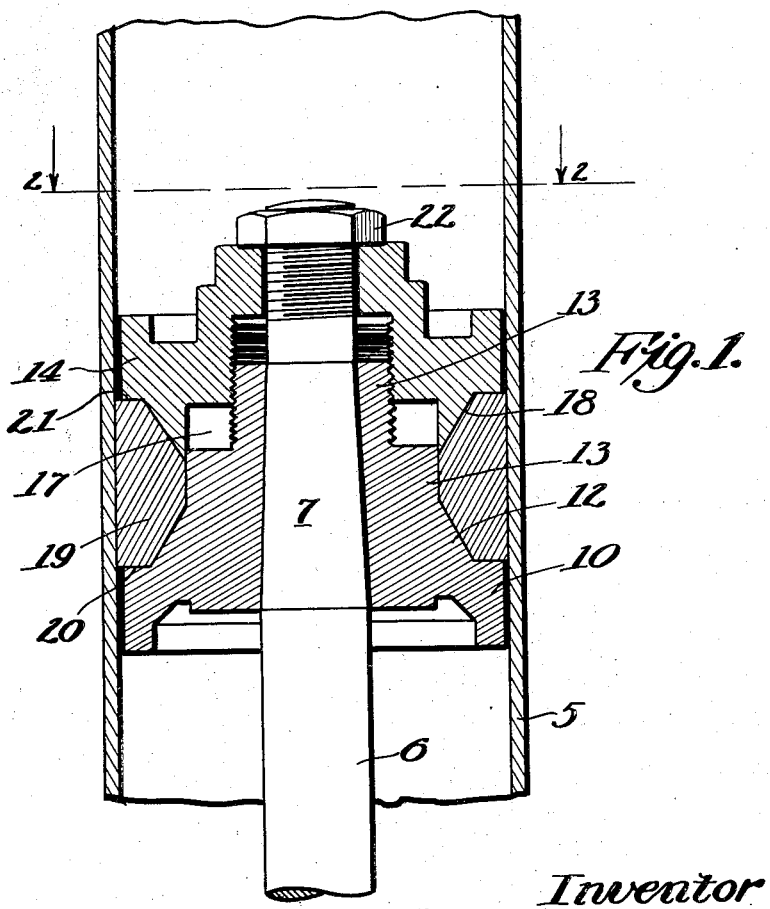
Inventor
Wilson B. Wigle
by Edmund A. Thraso
Atty Patented June 9, 1925.

1,541,546

UNITED STATES PATENT OFFICE.

WILSON B. WIGLE, OF LONG BEACH, CALIFORNIA, ASSIGNOR TO MARY R. WIGLE, OF LOS ANGELES, CALIFORNIA.

PISTON-PACKING-EXPANDING DEVICE.

Application filed July 11, 1923. Serial No. 650,832.

*To all whom it may concern:*

Be it known that I, WILSON B. WIGLE, a citizen of the Dominion of Canada, residing at Long Beach, in the county of Los Angeles and State of California, have invented new and useful Improvements in Piston-Packing-Expanding Devices, of which the following is a specification.

This invention relates to improvements in devices for expanding the packing of pump pistons, and is designed as an improvement of my patented device entitled "Pump packing expander," for which U. S. Letters Patent No. 1,243,648, were issued to me on October 16, 1917.

In the patented device above referred to, the piston consisted of a tapered body portion, and a tapered follower, the tapered portions being oppositely disposed, an expandible packing member being interposed. In this construction, in order to expand the packing member, a plurality of circular rings or shims are employed, and as the packing becomes worn, one of the rings at a time has to be removed in order to expand the packing member, this method of moving the follower to expand the packing member occasioning considerable loss of time as the device has to be dismantled at each expanding operation.

By means of this present improvement, no dismantelling of the piston is necessary, as the follower, or expanding member, can be readily adjusted to expand the packing to the desired extent and locked in the adjusted position by means of a simple locking nut.

The detailed construction will appear in the course of the following description in which reference is had to the accompanying drawings forming a part of this specification, wherein:

Figure 1 is a central longitudinal section through the device.

Fig. 2 is a transverse section through the device taken on line 2—2 of Fig. 1.

Referring specifically to the accompanying drawings, 5 designates a pump liner, within which is disposed a piston. A piston rod 6 has a tapered portion 7 and an outer threaded end 8 for the reception of a lock nut 9.

The piston comprises a body portion 10 provided with a centrally disposed tapered bore in which the tapered portion of the rod 6 is disposed. The lower portion of the body is cylindrical, and of slightly less diameter than the internal diameter of the pump liner, and is provided above the cylindrical portion with a conical face 12 from the upper end of which extends a cylindrical extension 13, an externally threaded hollow stud of less diameter than the extension 13 extending upwardly from its face.

Mounted on the upper end of the piston rod 7 is a follower 14, provided with a centrally disposed bore 15 in its upper end, and an enlarged threaded bore 16 directly below said bore of the same diameter as the threaded extension 13 with which it engages when the piston is assembled. The under face of the follower is provided with a cylindrical recess 17, of a diameter slightly greater than the diameter of extension 13. The outer peripheral wall 18, is tapered similar to the conical face 12 of the body portion. Disposed in the annular recess formed between the body portion 10 and the follower 14, is a resilient packing 19, preferably rubber, its inner annular wall being of the same configuration as the annular recess formed between the two members, its upper and lower faces engaging the flat annular faces 20 and 21 of the body portion and follower respectively.

It will be apparent that as the follower 14 is moved toward the piston portion or body 10, the packing 19 will be compressed and expanded diametrically. As the packing wears away and becomes loose it will be necessary to expand the same, which is done in the following manner. The lock nut 22 is loosened and a wrench is applied to the follower which is rotated downwardly on the threaded extension 13. After the packing has been expanded to the desired extent, the lock nut 22 is screwed downwardly on the threaded end of piston rod 7 so as to maintain the follower in its adjusted position.

From the foregoing it will be noted that I have dispensed with washers or shims for adjusting the follower member as the packing becomes worn.

What I claim is:

In a piston construction, the combination of a piston rod having a cylindrical threaded upper end and a tapered portion therebelow, a cylindrical piston body having a centrally disposed tapered bore extending therethrough mounted on the tapered portion of the piston rod, said body being provided above its cylindrical portion with a conical surface and a cylindrical portion extending upwardly therefrom, an externally threaded centrally disposed hollow stud formed integrally with the upper end of said piston body, a cylindrical piston follower having a centrally disposed bore and a circular threaded recess therebelow, said recesses engaging the threaded stud of the piston body, the lower portion of said follower being provided with an inverted conical surface, the conical surfaces of the piston body and follower forming the walls of a packing recess, an expansible packing mounted in said recess, said follower being further provided with a cylindrical recess disposed below the threaded circular recesses formed therein and telescopically engaging the upper cylindrical portion of the piston body, and means to lock said follower in position after an expansion of the packing.

In witness that I claim the foregoing I have hereunto subscribed my name this 22nd day of June, 1923.

WILSON B. WIGLE.